United States Patent [19]

Ogawa

[11] Patent Number: 4,620,300
[45] Date of Patent: Oct. 28, 1986

[54] DIGITAL SIGNAL DETECTING AND COMPENSATING CIRCUIT WITH ADJUSTABLE WINDOW SIGNAL

[75] Inventor: Hiroshi Ogawa, Tokyo, Japan
[73] Assignee: Sony Corporation, Tokyo, Japan
[21] Appl. No.: 784,699
[22] Filed: Oct. 3, 1985

Related U.S. Application Data

[63] Continuation of Ser. No. 443,902, Nov. 23, 1982, abandoned.

[30] Foreign Application Priority Data

Dec. 8, 1981 [JP] Japan ................................ 56-197189
Dec. 10, 1981 [JP] Japan ................................ 56-198814

[51] Int. Cl.[4] ........................ G11B 7/00; G11B 19/00; G11B 19/28
[52] U.S. Cl. ........................................ 369/33; 369/47; 369/59; 360/40; 360/51; 375/106; 375/112
[58] Field of Search ............... 358/148, 322, 339, 342; 360/36.2, 40, 51; 369/47–49, 59, 32, 33; 371/61; 375/106, 112, 113, 114, 118, 119, 120

[56] References Cited

U.S. PATENT DOCUMENTS

| 3,573,359 | 4/1971 | Barrett Guisinger . |
| 3,602,828 | 8/1971 | Kurzweil, Jr. ................. 371/61 X |
| 3,789,380 | 1/1974 | Cannon . |
| 4,106,058 | 8/1978 | Romeas et al. ................ 358/128 |
| 4,109,236 | 8/1978 | Besenfelder et al. .......... 371/6 |
| 4,141,046 | 2/1979 | Brown ............................. 360/51 |
| 4,275,466 | 6/1981 | Yamamoto .................... 360/51 X |
| 4,281,356 | 7/1981 | Sousa ............................. 360/51 X |
| 4,313,136 | 1/1982 | Kimura . |
| 4,338,683 | 7/1982 | Furukawa et al. . |
| 4,353,130 | 10/1982 | Carasso et al. ............... 360/51 |
| 4,357,707 | 11/1982 | Delury ........................... 360/51 X |
| 4,425,646 | 1/1984 | Kinoshita et al. ............. 360/51 X |

FOREIGN PATENT DOCUMENTS

| 1816041 | 6/1970 | Fed. Rep. of Germany . |
| 2257817 | 11/1972 | Fed. Rep. of Germany . |
| 3004799 | 10/1980 | Fed. Rep. of Germany . |
| 2079994 | 1/1982 | United Kingdom . |

OTHER PUBLICATIONS

European Search Report of E.P. 0081757 1-sheet.

Primary Examiner—Robert L. Richardson
Attorney, Agent, or Firm—Lewis H. Eslinger; Alvin Sinderbrand

[57] ABSTRACT

In a detecting and compensating circuit of an apparatus for reproducing a digital signal separated by frame synchronizing signals into frames, each having a predetermined frame period, the combination comprising a detecting circuit which detects the frame synchronizing signals and generates respective detection signals in response thereto, a gating circuit which receives the detection signals and which gates the latter in response to gating signals, and a windowing circuit which generates window signals of a predetermined length in response to the detection signals and which supplies the window signals as the gating signals to the gating circuit.

17 Claims, 52 Drawing Figures

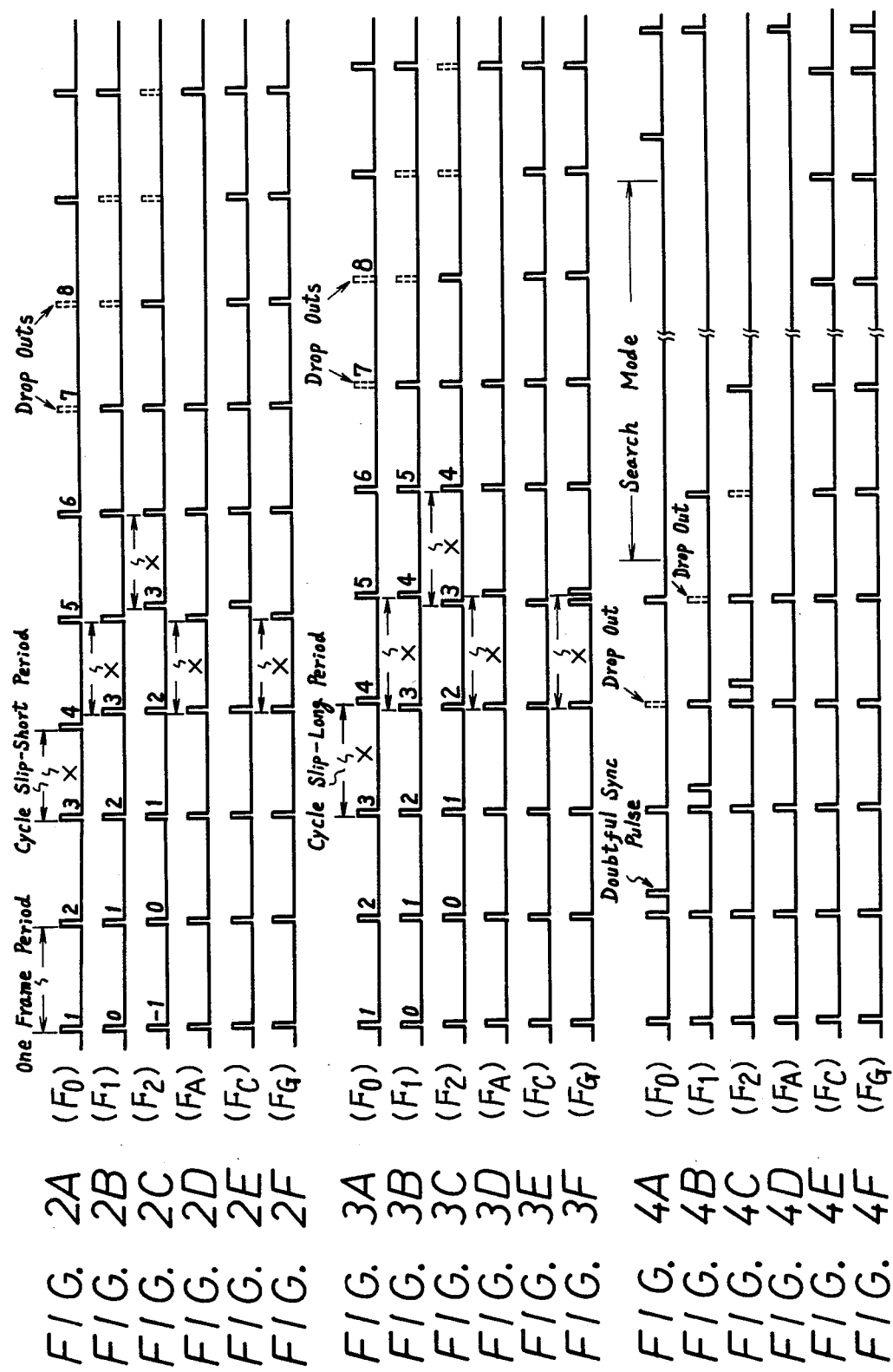

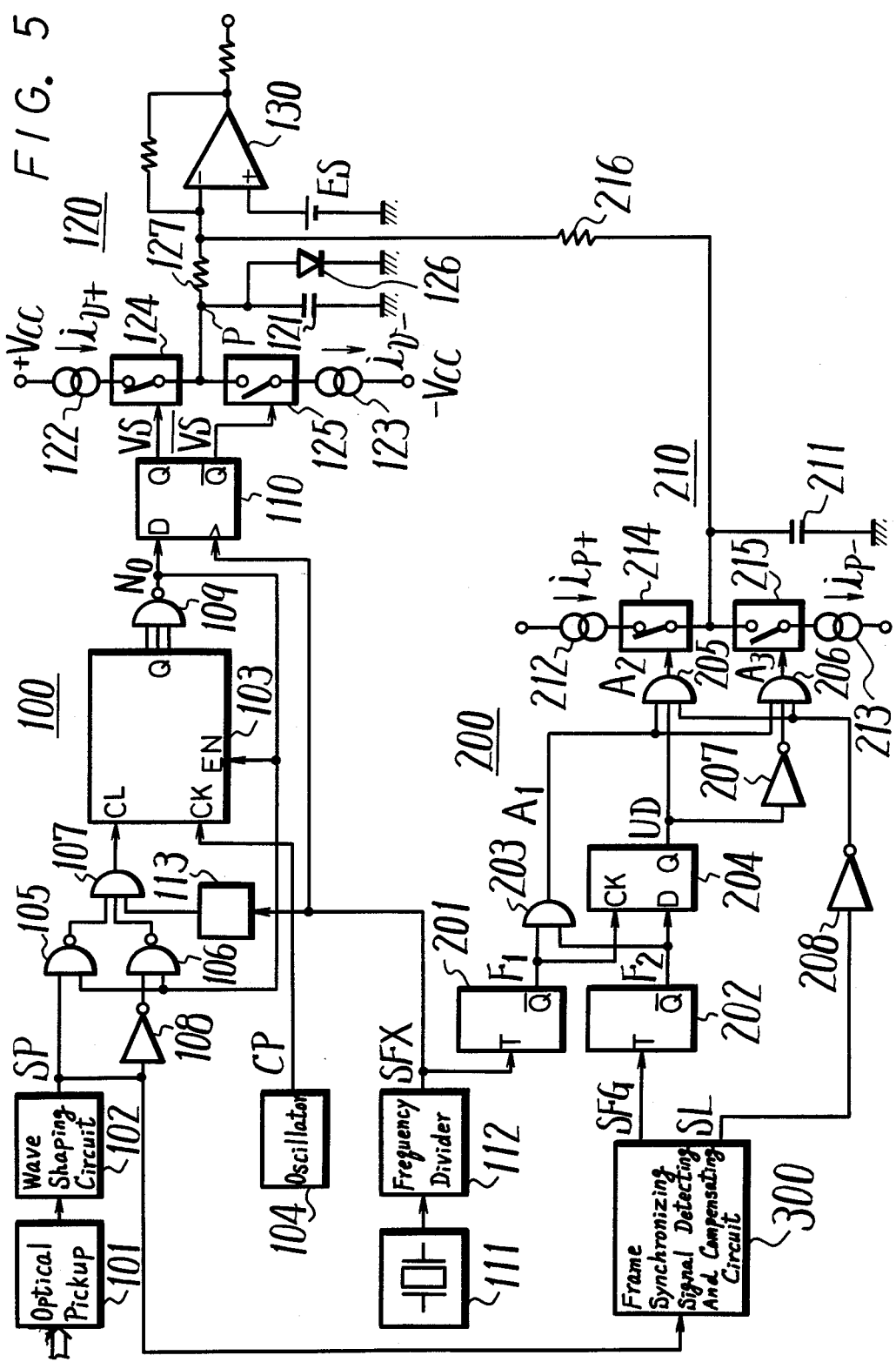

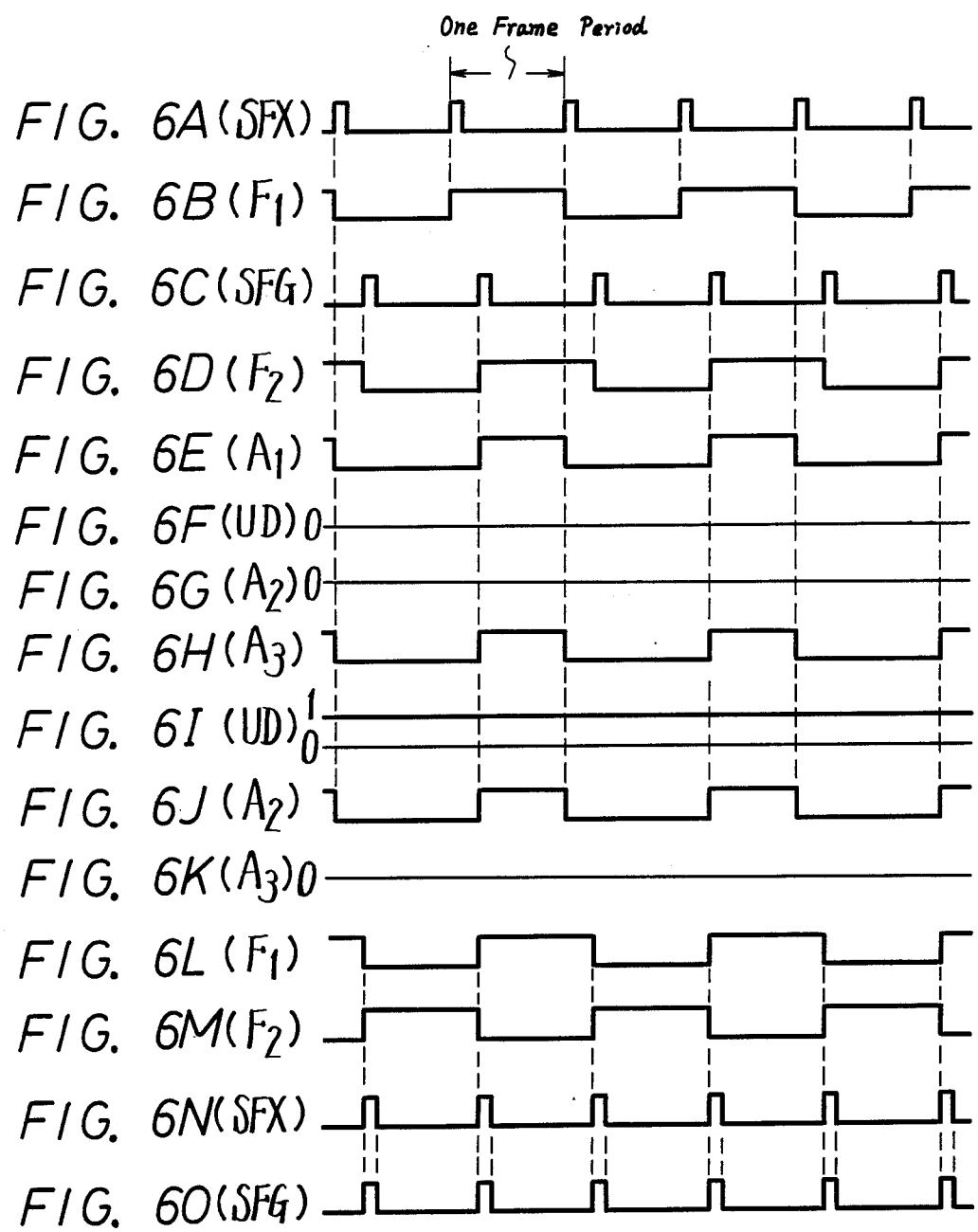

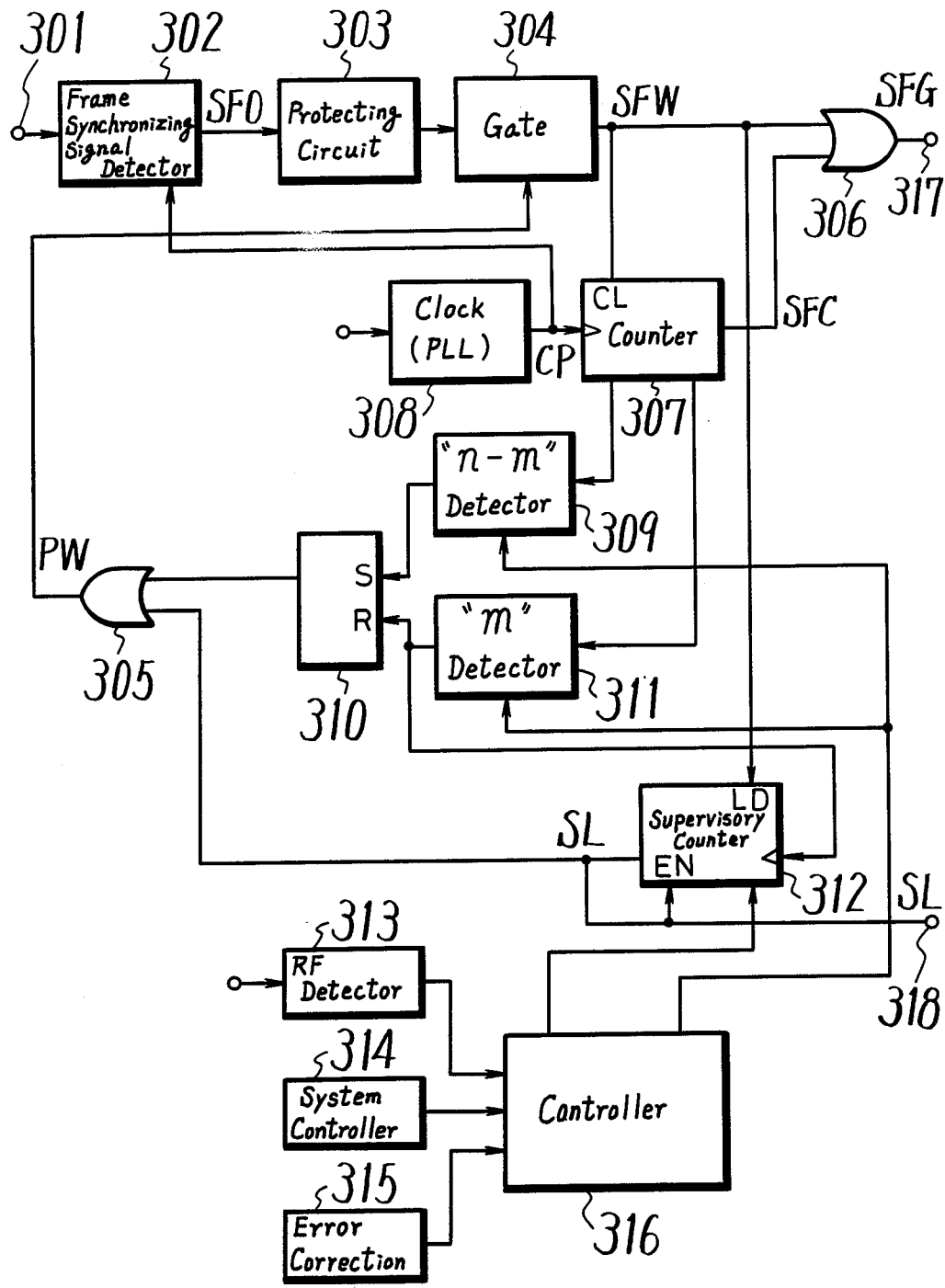

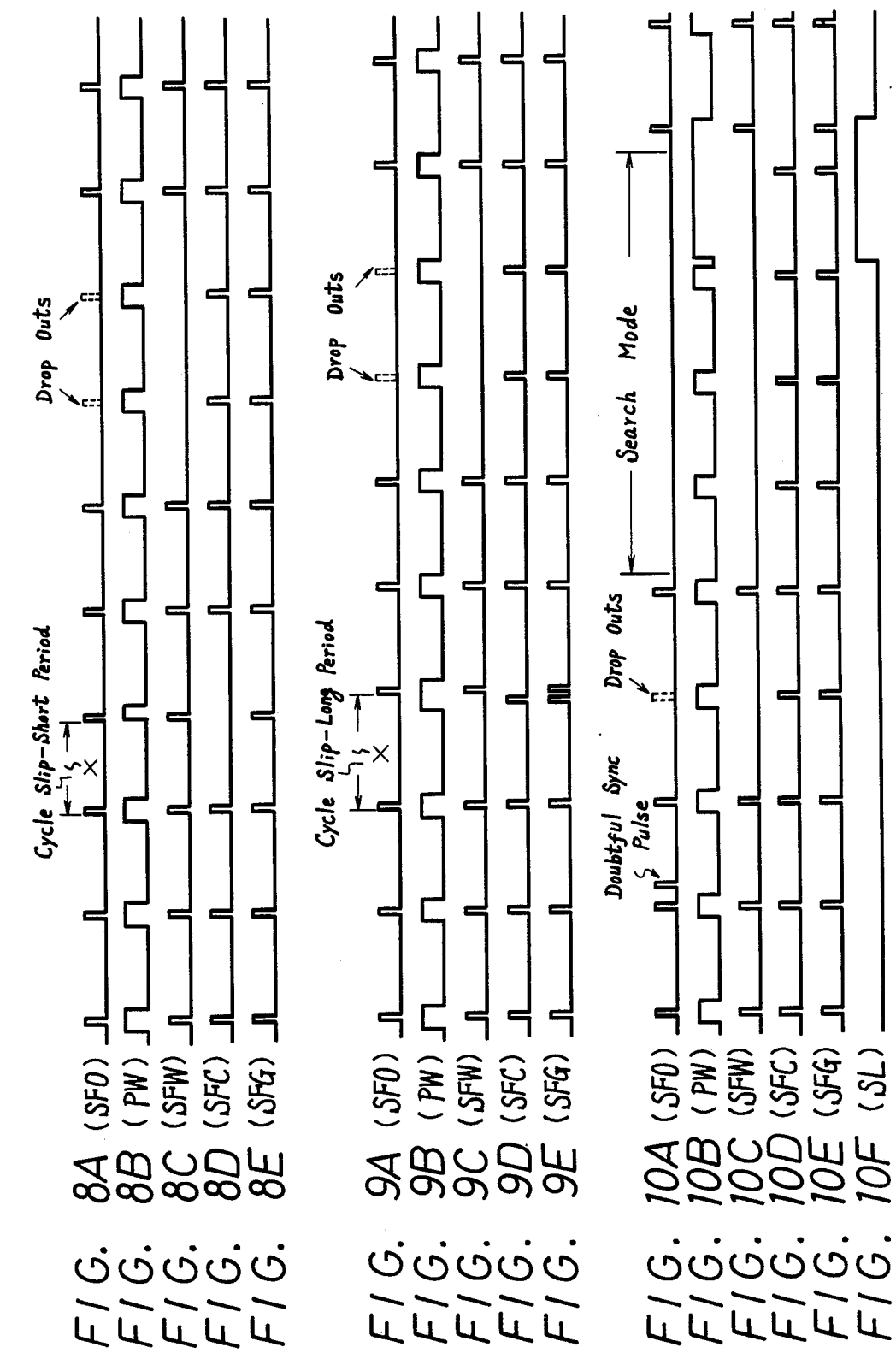

DIGITAL SIGNAL DETECTING AND COMPENSATING CIRCUIT WITH ADJUSTABLE WINDOW SIGNAL

This is a continuation of application Ser. No. 06/443,902, filed Nov. 23, 1982 and now abandoned.

BACKGROUND OF THE INVENTION

1. Field of the Invention

This invention relates to devices for reproducing a digital signal, and more particularly, to a frame synchronizing signal detecting and compensating circuit for use in a reproducing apparatus which generates a digital signal separated into frames.

2. Description of the Prior Art

An audio signal can be digitally recorded on a disc by a pulse code demodulation (PCM) system. The audio PCM signal is recorded on a base band which is not the carrier modulation system (and can be, for example, amplitude modulation, frequency modulation, or the like.) A run length limited code has been used to record the audio PCM signal on the disc. In a run length limited code, a minimum transition interval $T_{min}$ extends between two pieces data in order to enhance the efficiency of the recording (where $T_{min}$ is the minimum number of consecutive bits of the same type.) A maximum transition interval $T_{max}$ between two data pieces is shortened so that the self clocking action performed by the reproducing apparatus is more easily performed (where $T_{max}$ is the maximum number of consecutive bits of the same type).

The digital signal is frequently separated into a number of blocks or frames so that error correction and other processing can be easily performed. Usually, each block of data is individually processed in the conversion to analog data. In a digital audio disc, the length of one data block is made equal to one frame period. Each data block, of course, is provided at its start point with a frame or block synchronizing signal.

A bit pattern not used in the run length limited code is ordinarily selected as the frame synchronizing signal for ease of detection. One prior art system takes advantage of the fact that the modulation output of two maximum transition intervals $T_{max}$ do not occur in the normal modulation method, and uses as the frame synchronizing signal a bit pattern of two successive maximum transition intervals $T_{max}$. With respect to a run length limited code, this means that the frame synchronizing signal is formed by a first interval of continuous "1"s during the first maximum transition interval $T_{max}$, followed by a second interval of continuous "0"s during the next maximum transition interval $T_{max}$.

However, the frame synchronizing signal is not always properly detected and processed. Accordingly, a compensating circuit which compensates for an improperly detected and/or processed frame synchronizing signal is generally provided in the reproducing apparatus.

The compensating circuit in the reproducing apparatus must accommodate a number of different kinds of errors. For example, a frame synchronizing signal can be omitted or "dropped" by a scratch or the like formed on the surface of the disc. As another example, a pulse form which closely resembles the frame synchronizing signal can occur in a reproduced signal. Such a digital signal can be erroneously identified as a frame synchronizing signal, with the result that subsequent data processing operations are erroneously performed. As a third example, when a digital audio disc player is operated in a search mode to access the beginning of an audio signal, the frame synchronizing signal might not be detected. It is preferable for the frame synchronizing signal to be immediately identified upon the completion of the search mode, so that the audio signal can be correctly reproduced in the normal playback mode. As a fourth example, the frame period for the digital data can vary.

Conventional compensating circuits for use in reproducing apparatuses require a memory which operates at high speed. A majority logic circuit is also used to identify the frame synchronizing signals. In such a majority logic circuit, when a doubtful frame synchronizing pulse occurs repeatedly at the same position in each frame period, the doubtful frame synchronizing pulses cannot be removed.

Reproducing apparatuses for digitally recorded signals generally employ a control circuit to control the rotational speed of the disc. A velocity control circuit controls large fluctuations in the speed of the disc. A phase control circuit controls minor fluctuations in the speed of the disc since it has a limited lock range. The phase control circuit thus cannot be locked into operation until the speed of the disc is approximately set by the velocity control circuit. Accordingly, the speed of the disc must be ascertained before the phase control circuit is switched into operation with the velocity control circuit.

OBJECTS AND SUMMARY OF THE INVENTION

It is an object of the present invention to provide an apparatus for reproducing a digital signal which does not suffer from the above-described defects in the prior art.

It is another object of the present invention to provide an apparatus for reproducing a digital signal with a simple compensating circuit for handling errors which occur in detecting a frame synchronizing signal.

It is another object of the present invention to provide an apparatus for reproducing a digital signal which does not require a large capacity memory.

It is still another object of the present invention to provide an apparatus for reproducing a digital signal in which a signal which occurs at the same position during successive frame periods and is erroneously identified as a frame synchronizing signal by a detection circuit can be removed.

It is still another object of the present invention to provide an apparatus for reproducing a digital signal which can perform optimum frame synchronizing signal compensating operations in accord with more than one operating mode of the reproducing apparatus.

It is yet a further object of the present invention to provide an apparatus for reproducing a digital signal in which a phase control circuit, which makes minor corrections to the speed of the reproducing apparatus, is added to a velocity control circuit, which makes large corrections to the speed of the reproducing apparatus, in response to a circuit which detects the frame synchronizing signals.

In accord with the present invention, a detecting and compensating circuit in an apparatus for reproducing a digital signal separated by frame synchronizing signals into frames, each having a predetermined frame period, comprises detecting means for detecting the frame synchronizing signals and generating respective detection signals in response thereto, gating means receiving the detection signals for gating the latter in response to gating signals, and windowing means for generating window signals of a predetermined length in response to the detection signals and for supplying the window signals as the gating signals to the gating means.

The above, and other objects, features and advantages of the present invention will be apparent from the following detailed description of an illustrative embodiment thereof which is to be read in connection with the accompanying drawings.

BRIEF DESCRIPTION OF THE DRAWINGS

FIGS. 2A to 2F are time charts illustrating the operation of the compensating circuit of FIG. 1 when supplied with a digital signal having a short period and drop outs of the frame synchronizing signal;

FIGS. 3A to 3F are time charts illustrating the operation of the compensating circuit of FIG. 1 when supplied with a digital signal having a long period and drop outs of the frame synchronizing signal;

FIGS. 4A to 4F are time charts illustrating the operation of the compensating circuit of FIG. 1 when supplied with a digital signal having a doubtful frame synchronizing signal and with a drop out of the frame synchronizing signal, and when supplied with a digital signal from a reproducing apparatus when it is operated in a search mode;

FIG. 5 is a block diagram illustrating a rotational speed control system used in an apparatus for reproducing a digital signal;

FIGS. 6A to 6O are waveform diagram illustrating the operation of the system of FIG. 5;

FIG. 7 is a block diagram illustrating a frame synchronizing signal detecting and compensating circuit in accord with the present invention;

FIGS. 8A to 8E are time charts illustrating the operation of the circuit of FIG. 7 when supplied with a digital signal having a short period and drop outs of the frame synchronizing signal;

FIGS. 9A to 9E are time charts illustrating the operation of the circuit of FIG. 7 when supplied with a digital signal having a long period and drop outs of the frame synchronizing signal; and FIGS. 10A to 10E are time charts illustrating the operation of the circuit of FIG. 7 when supplied with a digital signal having a doubtful frame synchronizing signal, a drop out of the frame synchronizing signal, and when supplied with a digital signal from a reproducing apparatus operated in a search mode.

DESCRIPTION OF THE PREFERRED EMBODIMENTS

Figure 1:
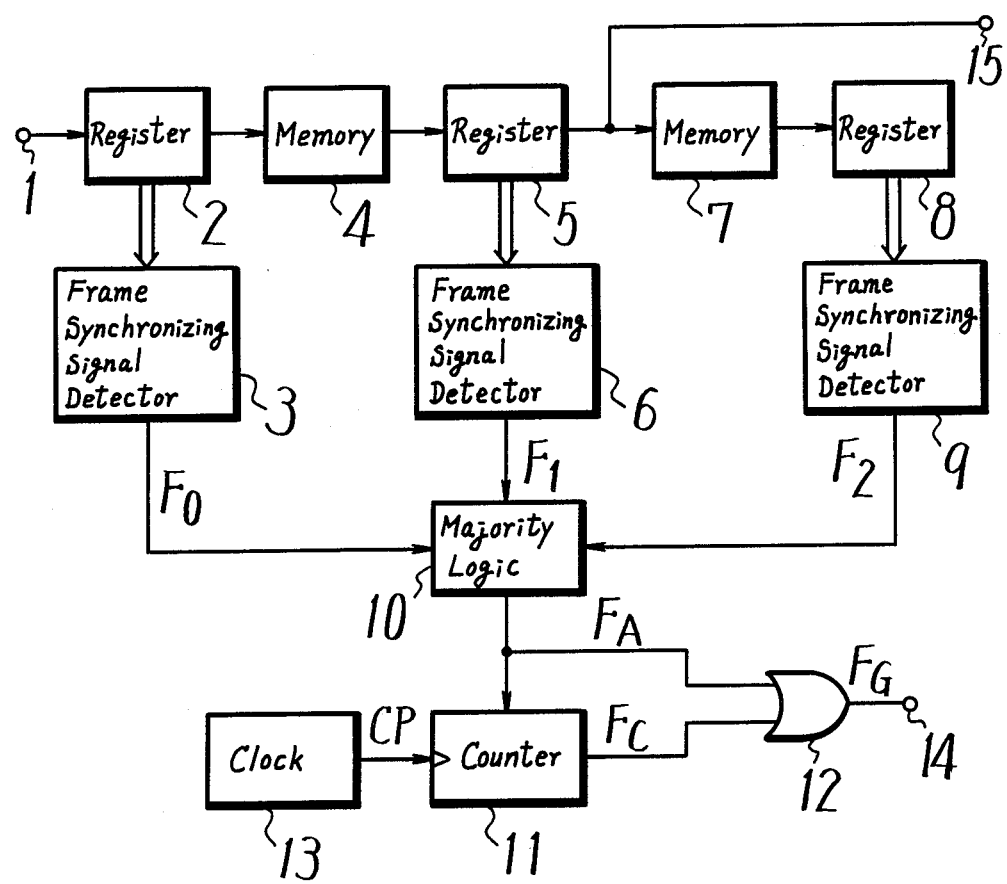
FIG. 1 is a block diagram illustrating a prior art compensating circuit for frame synchronizing signals in a digital signal.

In a prior art compensating circuit as illustrated in FIG. 1, a reproduced digital data signal is supplied to an input terminal 1 and a shift register 2. Shift register 2 has shift stages for n bits corresponding to the length of a frame synchronizing signal. Data having n parallel bits are supplied by shift register 2 to a frame synchronizing signal detection circuit or detector 3. The frame synchronizing signal in the reproduced digital data signal is identified in frame synchronizing signal detector 3 when the bit pattern of the frame synchronizing signal coincides with a predetermined bit pattern.

The data from shift register 2 are also supplied to a memory unit 4 which stores therein one block or frame period of data. The data stored in memory unit 4 is then supplied to a shift register 5 and is delayed by one frame period. Shift register 5 is similar to shift register 2, and has shift stages for n bits so that parallel data of n bits are delivered from shift register 5 to a second frame synchronizing signal detection circuit or detector 6 wherein the frame synchronizing signal is detected again (just as in frame synchronizing signal detector 3). The data from shift register 5 is also supplied to a second memory unit 7 which is similar to memory unit 4 and stores one block of data therein. Data stored in memory unit 7 is delayed by one frame period and supplied to a shift register 8. Shift register 8 is similar to shift registers 2 and 5 so that parallel data of n bits are supplied to a third frame synchronizing signal detection circuit or detector 9 wherein the frame synchronizing signal is detected when it is delayed by two frame periods with respect to the reproduced digital data.

Frame synchronizing signal detection signals $F_0$, $F_1$, and $F_2$ generated, respectively, by frame synchronizing signal detectors 3, 6 and 9, are supplied to a majority logic circuit 10. Majority logic circuit 10 supplied an output signal $F_A$ when two or more of the three frame synchronizing signal detection signals $F_0$, $F_1$, and $F_2$ coincide. When the rotational speed of the disc is steady, frame synchronizing signal detectors 3, 6, and 9 produce frame synchronizing signals $F_0$, $F_1$ and $F_2$ at coincident frame cycles or periods. When the phases of frame synchronizing signal detection signals $F_0$, $F_1$, coincide, majority logic circuit 10 produces output signal $F_A$ for each frame period.

If two or more frame synchronizing signals successively drop out of the digital signal, the phases of two or more of frame synchronizing signal detection signals $F_0$, $F_1$, and $F_2$ do not coincide at the time when the drop outs occur, so that majority logic circuit 10 does not produce output signal $F_A$. The frame synchronizing signal is thus not properly detected.

Clock generator 13 supplies clock pulses CP to a clock terminal of a counter 11. Counter 11 produces a carry pulse $F_C$ in response to the clock pulses CP counted during one frame period. Accordingly, carry pulse $F_C$ has a period corresponding to the frame period of the reproduced digital signal. Counter 11 produces a signal for each frame period even when majority logic circuit 10 does not generate output signal $F_A$, the frame synchronizing signal detection signal with the correct period. If Majority logic circuit 10 produces a frame synchronizing signal detection signal with the correct period, counter 11 is reset thereby so that the phase of carry pulse $F_C$ coincides with the detected frame synchronizing signal.

Carry pulse $F_C$ is supplied to one input terminal of an OR gate 12. Output signal $F_A$ is supplied to another input terminal of OR gate 12. OR gate 12 produces a frame synchronizing signal detection signal $F_G$ if the frame synchronizing signal from majority circuit 10 is correct. Carry pulse $F_C$ from counter 11 is supplied through OR gate 12 to output terminal 14 as signal $F_G$ when the frame synchronizing signal is not generated by majority circuit 10 due, for example, to a drop out.

In FIG. 1, it is to be appreciated that the reproduced digital data is generated at output terminal 15.

A digitally recorded signal on a disc must be synchronized in a bit-wise fashion with a clock signal in the reproducing apparatus for the reproduction to be performed. When the clock signal and the reproduced signal deviate in phase from each other, and the phase deviation is added thereto, a cycle slip phenomenon can occur in which the frame synchronizing signal from one cycle period is dropped and/or changed in position. In a bit synchronizing circuit, the frequency of a variable frequency oscillator in a phase locked loop (PLL) circuit and the time constant of a low-pass filter are selected so that a time error caused by the cycle slip phenomenon is kept to about ±1 or 2 bits.

The operation of the circuit of FIG. 1 will now be described with reference to the timing charts of FIGS. 2A to 2F, 3A to 3F, and 4A to 4F.

In FIG. 2A, the period between the third and fourth frame synchronizing signals is shortened due to the cycle slip phenomenon, while the seventh and eighth frame synchronizing signals disappear due to drop outs. (The periods identified by the X marks in FIGS. 2A to 2F indicate periods having erroneous lengths.)

As illustrated in FIG. 2D, output signal $F_A$ from majority logic circuit 10 is generated at the timing of the fourth frame synchronizing signal since frame synchronizing signal detection signal $F_1$ from frame synchronizing signal detector 6 has the same phase as frame synchronizing signal detection signal $F_2$ from frame synchronizing signal detector 9. Output signal $F_A$ from majority logic circuit 10 is generated at the timing of the fifth frame synchronizing signal since frame synchronizing signal detection signals $F_0$ and $F_1$ are in phase.

Counter 11 is reset by output signal $F_A$ from majority logic circuit 10 and produces carry pulse $F_C$, as shown in FIG. 2E. Counter 11 does not generate signal $F_C$ in the fifth frame period because the period between the fourth and fifth signals is shorter than the normal frame period. Thus, counter 11 is reset by output signal $F_A$ before it generates carry pulse $F_C$.

Output signal $F_A$ from majority logic circuit 10 and carry pulse $F_C$ from counter 11 are supplied to OR gate 12 which supplies output signal $F_G$ as the frame synchronizing signal detection signal, as shown in FIG. 2F. As is clear from the time charts, the frame synchronizing signal for the drop out period is produced by carry pulse $F_C$ with a frame period derived from counter 11.

FIGS. 3A to 3F illustrate a digital signal in which cycle slip occurs between the third and fourth frame synchronizing signals and the length of the period accordingly becomes longer than one frame period, and in which drop outs occur in the seventh and eighth frame periods.

Since the length of the cycle slip is longer than one frame period, counter 11 is not reset before it generates carry pulse $F_C$. Carry pulse $F_C$ for the frame period is generated (as shown in FIG. 3E), but counter 11 is reset by output signal $F_A$ from majority logic circuit 10 during the period between the generation of the first carry pulse $F_C$ and the following carry pulse $F_C$ so that the period therebetween corresponds to the length of the cycle slip, i.e. is lower than one frame period. FIG. 3F illustrates frame synchronizing signal detection signal $F_G$ supplied at output terminal 14.

FIGS. 4A to 4F illustrate a digital signal in which the noise therein is mixed with the frame synchronizing signal to form a doubtful frame synchronizing signal. FIGS. 4A to 4F also illustrate the digital signal from a reproducing apparatus operated in the search mode wherein the frame synchronizing signals are not detected by the frame synchronizing signal detectors 3, 6, 9.

In FIGS. 4A to 4C, the doubtful frame synchronizing signal does not overlap at the same position in frame synchronizing signal detection signals $F_0$, $F_1$ and $F_2$, so that majority logic circuit 10 produces output signal $F_A$ (as shown in FIG. 4D) without the doubtful frame synchronizing pulse.

When the reproducing apparatus is operated in the search mode, and the frame synchronizing signal is not detected, counter 11 produces signal $F_C$ for each frame period and which is supplied to output terminal 14 as frame synchronizing signal detection signal $F_G$. After the search mode of operation has ended, majority logic circuit 10 generates output signal $F_A$ at a position for the second frame synchronizing signal, as counted from the end of the search mode, whereby counter 11 is reset before carry pulse $F_C$ is generated again. As shown in FIG. 4E, the corresponding frame period is longer than one frame period. A frame synchronizing signal detection signal $F_G$ is generated at output terminal 14, as shown in FIG. 4F. In other words, a signal indicating the correct frame period is generated immediately after the termination of the search mode.

The circuit of FIG. 1, however, suffers from significant drawbacks. First, the circuit requires a memory unit which operates at high speed. Second, majority logic circuit 10 cannot remove a doubtful frame synchronizing pulse which repeatedly occurs at the same position in each frame period.

Several points must be considered in a frame synchronizing signal detecting and compensating circuit. First, a cycle slip which occurs in the reproduced digital signal is normally about ±1 or 2 bits, and is quite small when compared with the length of the frame period. Second, since the pattern for the frame synchronizing signal is especially selected, a safe region must be provided before and after the frame synchronizing signal so that it can be accurately detected. Third, the pattern for the frame synchronizing signal is not a pattern which ordinarily occurs in the modulation system so that as long as a drop out and a doubtful frame synchronizing signal are not mixed, the probability of the same pattern randomly occurring in the digital signal is approximately zero.

There are at least two known methods by which an audio pulse coded modulation (PMC) signal can be recorded on a disc. According to one method, the PCM signal is recorded with a constant angular velocity. In an alternate method, the PCM signal is recorded with a constant linear velocity. Recordings made with a constant linear velocity are preferable to recordings made with a constant angular velocity because the recording density for such recordings can be increased. In such an instance, the disc on which the recording is made must be reproduced at a constant linear velocity.

One known method for controlling disc rotation at a constant linear velocity detects the position of a pick-up device by a potentiometer. Since the disc must rotate faster as the pick-up device moves away from the center of the disc, the output signal from the potentiometer is fed to a divider circuit to generate speed control information from the position of the pick-up device. However, a potentiometer and a divider circuit for generating the speed control signals are both expensive and complicated.

According to another method, the disc is rotated at a constant linear velocity by detecting a reproduced signal from the disc. The length of time for a transition interval is measured and compared with a standard reference value. The speed of the disc is then changed according to the comparison.

When a disc is reproduced at a constant linear velocity, a minimum transition interval $T_{min}$ and a maximum transition interval $T_{max}$ in the reproduced signal assume predetermined reference values. Therefore, if the maximum transition interval $T_{max}$ or the minimum transition interval $T_{min}$ in the reproduced signal deviates from the reference value, the rotational speed can be controlled to reduce or eliminate the deviation, so that the disc rotates at a constant linear velocity.

Since the frame synchronizing signal is reproduced at each frame period, a velocity control circuit can be operated so that successive maximum transition intervals $T_{max}$, which are the frame synchronizing signals, assume a predetermined value.

In FIG. 5, a PCM audio disc reproducing apparatus includes a velocity control system 100, a phase control system 200, and a frame synchronizing signal detecting and compensating circuit 300 in accord with the present invention. Frame synchronizing signal detecting and compensating circuit 300 generates a detection signal in response to a frame synchronizing signal and compensates for drop outs, cycle slips, or the like. Compensating circuit 300 also generates a signal which determines whether the operation of phase control system 200 is added to velocity control system 100.

In velocity control system 100, an optional pick-up device 101 generates a signal which is supplied to a wave shaping circuit 102. The output signal from optical pick-up device 101 can be blunted or rounded. For example, a sinusoidal wave may be generated in response to data bits of "1" and "0". Wave shaping circuit 102 reshapes the signal from optical pick-up device 101 and delivers a substantially square wave in response to the blunted input wave.

A counter 103 detects the maximum transition interval $T_{max}$. A clock pulse CP having a frequency of, for example, about 34.6 MHz and generated by an oscillator 104 is supplied to a clock terminal CK of counter 103. An output signal SP from wave shaping circuit 102 is supplied to a clear terminal CL of counter 103 through a NAND gate 105 and an AND gate 107 whereby counter 103 is cleared at the falling or trailing edge of output signal SP. Output signal SP is supplied to an inverter 108 which supplies an output signal $\overline{SP}$ to a clear terminal CL of counter 103 by way of a NAND gate 106 and AND gate 107 whereby counter 103 is also cleared at the rising or leading edge of output signal SP. Counter 103 thus counts the number of clock pulses CP during the respective position and negative polarity transition intervals of output signal SP.

When output signal SP has a transition interval in which the number of clock pulses CP counted therein exceeds a predetermined number N (where N is a value counted during maximum transition interval $T_{max}$), counter 103 generates output signals of "1" at its Q output terminals. The output signals from the Q terminals of counter 103 are supplied to a NAND gate 109 which then generates an output signal $N_0$ having a value of "0" when the output signals from counter 103 are "1". Output signal $N_0$ is supplied to an enable terminal EN of counter 103, so that counter 103 stops the counting operation. Since output signal $N_0$ is also supplied to NAND gates 105 and 106, NAND gates 105 and 106 are turned off. Counter 103 cannot be cleared by a reproduced digital signal thereafter.

Output signal $N_0$ from NAND gate 109 is latched to a D-type flip-flop circuit 110 in response to the rising edge of a signal SFX. A quartz oscillator 111 supplies an output clock pulse to frequency divider 112 which divides the output clock pulses to generate signal SFX. In the illustrative embodiment, signal SFX has a frame period of 1/7.35 kHz.

After output signal $N_0$ from NAND gate 109 is latched to D-type flip-flop circuit 110 as described above, signal SFX is supplied to a clear terminal CL of counter 103 through a delay circuit 113 and AND gate 107 whereby counter 103 is cleared. Output signal $N_0$ from NAND gate 109 becomes "1" to place counter 103 in a count enable state and NAND gates 105 and 106 in an open state. Thus, the number of clock pulses CP counted during the transition intervals of the output signal SP are counted again.

Accordingly, counter 103 detects whether the maximum transition interval $T_{max}$ in the output signal SP is longer or shorter than a reference value for each frame period. The output signal from counter 103 is latched to D-type flip-flop circuit 110 after being supplied to NAND gate 109. If counter 103 detects that any one of the transition intervals of output signal SP is longer than the reference value for one frame period, output signal $N_0$ from NAND gate 109 becomes "0". When the respective transition intervals of output signal SP are shorter than the reference value, output signal $N_0$ from NAND gate 109 becomes "1". The output signal before the detection of the maximum transition interval $T_{max}$ is stored in D-type flip-flop circuit 110 during the succeeding frame period.

A charge and discharge circuit 120 includes a capacitor 121 for charge and discharge, a positive current source 122 and a negative current source 123. When an output signal VS from the Q terminal of D-type flip-flop circuit 110 is "0", and an output signal $\overline{VS}$ from $\overline{Q}$ output terminal of D-type flip-flop circuit 110 is "1", a switching circuit 124 is switched on so that a charging current $i_{v+}$ is supplied to capacitor 121 from positive current source 122. When output signal VS from the Q terminal of D-type flip-flop circuit 110 is "1", and output signal $\overline{VS}$ at $\overline{Q}$ output terminals of D-type flip-flop circuit 110 is "0", a switching circuit 125 is switched on so that capacitor 121 permits a discharging current $i_{v-}$ to flow through negative current source 123.

Accordingly, capacitor 121 is charged and discharged in response to the output signals from D-type flip-flop circuit 110. The voltage developed across capacitor 121 is supplied to an inverting input terminal of an operational amplifier 130 which operates as a comparator. A positive DC voltage ES is supplied to a non-inverting input terminal of operational amplifier 130. A difference output signal from operational amplifier 130 is supplied to a motor driving circuit (not shown) for rotating the disc.

When the rotational speed of the disc is slower than a predetermined linear velocity, the maximum transition interval $T_{max}$ in output signal SP is longer than the reference value. Output signal $N_0$ from NAND gate 109 becomes "0", switching circuit 124 is switched on while switching circuit 125 is switched off so that charging current $i_{v+}$ flows to capacitor 121. Since the voltage across capacitor 121 increases, the output voltage from operational amplifier 130 decreases, so that the rotational speed of the motor increases.

When the rotational speed of the disc is higher than a predetermined linear velocity, the maximum transition interval $T_{max}$ in the reproduced signal SP is shorter than the reference value, so that the output signal $N_0$ from NAND gate 109 becomes "1" during each frame period. Switching circuit 125 is switched on to permit discharging current $i_{v-}$ to flow from capacitor 121. The voltage across capacitor 121 is accordingly lowered, the output voltage from operational amplifier 130 increases, and the rotational speed of the motor decreases.

When the disc rotates at a constant linear velocity, the voltage across capacitor 121 is reduced substantially to zero.

A diode 126 (with a cathode connected to ground) is connected in parallel to capacitor 121 to prevent the motor from rotating in a reverse direction. When a potential at a point P in FIG. 5 is a positive voltage and exceeds reference voltage ES, the output signal from operational amplifier 130 approaches a negative voltage so that the motor would begin to rotate in a reverse direction. However, since diode 126 is connected between point P and ground, it is switched on. Hence, the potential at point P does not become positive, and the motor does not rotate in a reverse direction.

With reference to phase control system 200, signal SFX has a reference frame period which is produced by dividing the frequency of the output signals from quartz oscillator 111 in frequency divider 112. Signal SFX can form a constant phase relationship with a signal SFG which is syrnchronized with the frame synchronizing signal SF detected in the reproduced signal by frame synchronizing signal detecting and compensating circuit 300. The lock frequency for phase control system 200 is a function of the oscillation frequency generated by quartz oscillator 111. In the illustrative embodiment, the oscillation frequency of quartz oscillator 111 is selected so that when the maximum transition interval $T_{max}$ is the reference value and the velocity control is stable, phase control system 200 is locked.

Signal SFX is supplied to a flip-flop circuit 210 which generates a signal $F_1$ which is inverted at the leading edge of signal SFX. A signal SFG, having a frame period derived from frame synchronizing signal detecting and compensating circuit 300, is supplied to a flip-flop circuit 202 which generates a signal $F_2$ which is inverted at the leading edge of signal SFG. Signals $F_1$ and $F_2$ are supplied to input terminals of an AND gate 203 which generates an output signal $A_1$ indicative of the difference in phase between output signals $F_1$ and $F_2$. Output signal $A_1$ is supplied to the input terminals of AND gates 205 and 206.

Signal $F_2$ from the Q output terminal of flip-flop 202 is supplied to a D terminal of a D-type flip-flop circuit 204. Signal $F_1$ from the Q terminal of a D-type flip-flop 210 is supplied to clock terminal CK of flip-flop circuit 204. An output signal UD from the Q output terminal of flip-flop 204 is supplied to one input terminal of an AND gate 205. Output signal UD is also supplied to an inverter 207 which supplies its output to an AND gate 206.

AND gate 205 supplies an output signal $A_2$ to a charge and discharge circuit 210. AND gate 206 supplies an output signal $A_3$ to charge and discharge circuit 210.

Charge and discharge circuit 210 generates a phase control voltage in response to output signals $A_2$ and $A_3$ and includes a capacitor 211 for charge and discharge, a positive current source 212, and a negative current source 213. When output signal $A_2$ from AND gate 205 is "1", a switching circuit 214 is switched on so that positive current source 212 permits a charging current $i_{p+}$ to flow to capacitor 211. When output signal $A_3$ from AND gate 206 is "1", a switching circuit 215 is switched on so that capacitor 211 permits a discharging circuit $i_{p-}$ to flow through negative current source 213.

As illustrated in FIGS. 6L and 6M, when signals $F_1$ and $F_2$ have a phase difference of 180°, signals SFX and SFG have no phase difference therebetween. Output signal $A_2$ from AND gate 205 becomes "0" at all times. Phase control system 200 operates so that signals SFX and SFG maintain a predetermined phase relation therebetween.

When signals SFX and SFG have the phase relationship depicted in FIGS. 6A and 6C, and output signals $F_1$ and $F_2$ from flip-flop circuits 201 and 202 have a 180° phase difference as illustrated in FIGS. 6B and 6D, output signal UD from flip-flop circuit 204 becomes "0", as shown in FIG. 6F. Output signal $A_1$ from AND gate 203 has the displacement shown in FIG. 6E.

Although output signal $A_2$ from AND gate 205 becomes "0", as shown in FIG. 6G, AND gate 206 produces a signal having a width dependent on the phase deviation which is shown in FIG. 6H and identified as output signal $A_3$. Switching circuit 215 is switched on to allow a discharging current $i_{p-}$ to flow from capacitor 211 whereby the voltage thereacross decreases.

When signals SFX and SFG deviate in phase with respect to each other, as indicated in FIGS. 6A and 6C, the width of output signal $A_1$ from AND gate 203 does not change, but output signal UD from D-type flip-flop 204 becomes "1", as illustrated in FIG. 6I. Output signal $A_2$ of AND gate 205 has a width representative of the phase deviation as shown in FIG. 6G so that switching circuit 214 is switched on and switching circuit 215 is switched off thereby permitting a charging current $i_{p+}$ to flow to capacitor 211 whereby the voltage thereacross increases.

The voltage across capacitor 211 is added to the output voltage from charge and discharge circuit 120 in velocity control system 100 and then supplied to the inverting input terminal of operational amplifier 130 where it controls the speed of the motor.

In the illustrated embodiment, charge and discharge circuit 120 has a time constant $T_V$ and charge and discharge circuit 210 has a time constant $T_P$. Time constants $T_V$ and $T_P$ are selected whereby:

$$T_V > T_P$$

so that in a stationary state, velocity control circuit 100 controls large changes in the rotational speed of the disc, while phase control circuit 200 controls small changes in the rotational speed of the disc. It is to be appreciated that the disc rotates with minimal wow and flutter because of the circuit arrangement of the present invention.

Signal SFG generates a phase control signal and is derived from frame synchronizing signal detecting and compensating circuit 300 by frequency dividing an output signal of a PLL circuit which is synchronized with the clock component in the reproduced digital signal. The PLL circuit of frame synchronizing signal detecting and compensating circuit 300 has a limited lock range so that until the rotational speed of the disc is approximately equal to a predetermined linear velocity, the phase control system 200 cannot be brought into operation. It is to be appreciated that the rotational speed of the disc cannot be locked in phase with the output signal from quartz oscillator 111 following a large fluctuation in the linear velocity of the disc which can occur when the pick-up device scans the disc. Accordingly, phase control system 200 is disabled until the linear velocity of the disc becomes substantially constant.

In order to detect the frame synchronizing signal, a clock pulse is synchronized with the clock component in the reproduced digital signal and the bit pattern resulting therefrom is compared with the bit pattern from the frame synchronizing signal in the reproduced digital signal. In the illustrative embodiment, the output signal from the PLL circuit as described above is used for the clock pulse. Accordingly, when the linear velocity has not reached the predetermined speed, the PLL circuit is not locked in phase with the reproduced clock signal and the frame synchronizing signal cannot be reliably detected.

Frame synchronizing signal detecting and compensating circuit 300 thus includes a supervisory circuit which keeps a close watch on whether the frame synchronizing signal is reliably detected. Output signal SL (derived from frame synchronizing signal detecting and compensating circuit 300) is at a high level when the frame synchronizing signal is not reliably detected, as described hereinbelow. Output signal SL is supplied to AND gates 205, 206 through an inverter 208 so that until the linear velocity of the disc reaches a predetermined value, AND gates 205 and 206 are turned off by output signal SL, thereby inhibiting the operation of phase control system 200.

FIG. 7 illustrates one embodiment of a frame synchronizing signal detecting and compensating circuit 300 in accord with the present invention. Signal SP, such as digital data or the like, from wave shaping circuit 102 (see FIG. 5) is supplied to an input terminal 301 and thence, to a frame synchronizing signal detection circuit or detector 302. A clock pulse CP is synchronized with the reproduced signal derived from a clock generator 308 which includes a PLL circuit and is supplied to detector 302. Detector 302 generates a frame synchronizing signal detection signal SFO by detecting a signal having a bit pattern which is the same as the frame synchronizing signal in the reproduced signal as described hereinbefore. Frame synchronizing signal detection signal SFO is supplied to a protecting circuit 303 which mutes frame synchronizing detection signal SFO to prevent noise from being erroneously detected as a frame synchronizing signal. Protecting circuit 303 is most commonly utilized in the period during playback when the position of the pick-up device jumps and there is no reproduced signal. Protecting circuit 303 may be eliminated from the circuit of FIG. 7 and the circuit will operate as herein described.

Frame synchronizing signal detection signal SFO is supplied through protecting circuit 303 to a gate circuit 304. A window pulse PW supplied from an OR gate 305 functions as a gate signal for gate circuit 304. In one embodiment, window pulse P has a pulse width of 2 m bits (m bits± the position at which a normal frame synchronizing signal occurs). In one example, m can be equal to three. When a frame synchronizing signal occurs at the correct position and the phase of window pulse PW substantially coincides therewith, gate circuit 304 supplies a detection signal SFW to an OR gate 306. Detection signal SFW is also supplied to a clear terminal CL of a counter 307. A clock pulse CP is supplied to a clock terminal of counter 307. Clock pulse CP is synchronized with the clock component of the reproduced signal and is derived from a clock generator 308 equipped with a PLL circuit so that counter 307 generates a carry pulse SFC for each frame period. Carry pulse SFC is synchronized with the reproduced signal which results from dividing the frequency of lock pulse CP and is supplied to one input terminal of OR gate 306. OR gate 306 supplies a frame synchronizing signal detection signal SFG, as described more fully hereinbelow, to an output terminal 317.

Window pulse PW is generated in response to the count value from counter 307. When the count value "n" in counter 307, which corresponds to the frame period, is reduced by a number corresponding to m bits of the maximum value of a cycle slip (for example, 3 bits), the reduced count number n-m is detected by an "n-m" detector 309 and a flip-flop circuit 310 is accordingly set. When the count value of counter 307 corresponds to m bits, such count number is detected in an "m" detector 311 so that flip-flop circuit 310 is set. Since counter 307 is cleared by detection signal SFW, flip-flop circuit 310 generates a window signal which rises at a position m bits before the frame synchronizing signal occurs and which falls m bits after the trailing edge of the frame synchronizing signal. The window signal is supplied to one input terminal of OR gate 305 and comprises window pulse PW for gate circuit 304.

Gate circuit 304 does not generate detection signal SFW when the phase of the frame synchronizing signal significantly deviates from carry pulse SFC. A supervisory circuit (explained more fully hereinbelow) detects the phase displacement between the frame synchronizing signal and carry pulse SFC and forces counter 307 to make the frame synchronizing signal coincide in phase with carry pulse SFC.

Supervisory counter 312 comprises in part the above-described supervisory circuit. Detection signal SFW is supplied to a load terminal LD of supervisory counter 312 to preset the counter value therein. An output signal from "m" detector 311 is supplied to a clock terminal of supervisory counter 312 when the count value from counter 307 corresponds to m bits.

Since counter 307 counts the number of clock pulses CP at all times, "m" detector 311 generates a signal at each frame period which is supplied to and counted by supervisory counter 312. Gate circuit 304 generates detection signal SFW which is supplied to load terminal LD of supervisory counter 312 so that supervisory counter 312 is preset. It is to be appreciated that the count value in supervisory counter 312 does not increment more than the preset value plus one. When gate circuit 304 does not generate detection signal SFW, supervisory counter 312 counts the output signal from "m" detector 311 so that the count value therein increments. When the count value of supervisory counter 312 reaches a predetermined value (for example, eight), supervisory counter 312 generates an output signal SL which rises to a high level. Since output signal SL is supplied to an enable terminal EN of supervisory counter 312, the counting operation of supervisory counter 312 stops. Output signal SL from supervisory counter 312 is also supplied to gate circuit 304 as window pulse PW via OR gate 305. In other words, the gate signal remains at a high level to keep gate circuit 304 in an open state.

When gate circuit 304 generates detection signal SFW, supervisory counter 312 is placed into a load state again whereby output signal SL drops to a low level and supervisory counter 312 returns to a count enable state.

Functionally, when the phase of carry pulse SFC deviates considerably from the phase of the frame synchronizing signal in the reproduced signal, so that frame synchronizing signal detection signal SFO does not fall within the width of winding pulse PW, supervisory counter 312 detects such deviation and permits counter 307 to be cleared whereby the phase of carry pulse SFC is made to coincide with the frame synchronizing signal in the reproduced signal. (In the illustrative embodiment, supervisory counter 312 can be a preset type or an ordinary clear-type counter.)

In accord with the present invention, the width of window pulse PW and the preset value for supervisory counter 312 are controlled in accord with the operating mode of the reproducing apparatus and the state of the reproduced signal so that the compensating circuit will operate most efficiently.

In a normal playback mode, the width of window pulse PW is such that it will gate the frame synchronizing signal detection signal even when a cycle slip occurs. For example, the frame synchronizing signal can be within ±3 bits of the position where it is expected to be detected. The width of ±3 bits is generally acceptable in a normal playback mode when the data error in the reproduced signal is random. However, when there are a large number of burst errors in the reproduced signal, the amount of cycle slip increases since the amount of the phase deviation between the reproduced signal and the clock signal accumulates. The width of window pulse PW must be correctly widened.

Supervisory counter 312 corrects phase deviations between window pulse PW and frame synchronizing signal detection signal SFO. When the frame synchronizing signal is reliably detected, as in a normal playback mode, the phase of window pulse PW is correct even if detection signal SFW disappears as a result of a drop out or the like. If the supervisory circuit operates under such conditions, the width of window pulse PW is substantially increased. Noise, such as a doubtful frame synchronizing signal and the like, cannot be eliminated, however. Accordingly, the number of frames required to be detected before output signal SL rises to the high level is relatively large, for example, sixteen. It is to be appreciated that the number of frames required to raise output signal SL to the high level is the same as the number of output signals generated by "m" detector 311.

When the reproducing apparatus is operated in a search mode to access the beginning of a recording, output signal SL rises to a high level shortly after the frame synchronizing signal is no longer detected. In the illustrative embodiment, output signal SL rises to a high level after three frame periods.

When the reproduced signal disappears during playback, supervisory counter 312 raises output signal SL to a high level immediately after the frame synchronizing signal disappears. In addition, the rotational speed of the disc is controlled when the reproduced signal disappears so that the width of window pulse PW is increased to its maximum.

The supervisory circuit in accord with the present invention includes an RF detector 313 which detects the presence of a reproduced signal and supplies a detected output signal to a controller 316. A system controller 314 supplies a signal to controller 316 which indicates the operating mode of the reproducing apparatus. An error correction circuit 315 detects errors in the reproduced signal and supplies a signal indicative of the errors to controller 316.

Controller 316 supplies control signals to "n-m" detector 309 and "m" detector 311 to vary the count value corresponding to the "m" bits. The value of m and the corresponding width of window pulse PW vary in accord with the errors detected in the digital signal by error correction circuit 315.

Controller 316 supplies an output signal to vary the preset value of supervisory counter 312 in accord with the operating mode of the reproducing apparatus and the presence of a reproduced signal detected by RF detector 313.

The operation of the frame synchronizing signal detecting and compensating circuit of FIG. 7 will now be described with reference to the timing charts of FIGS. 8, 9 and 10. In FIGS. 8A to 8E, the digital signal supplied to the circuit of FIG. 7 has a frame period which is shorter than a normal frame period because of a cycle slip, and also has drop outs in the seventh and eighth frames. FIG. 8A illustrates frame synchronizing signal detection signal SFO from frame synchronizing signal detector 302. FIG. 8B illustrates window pulse PW generated by flip-flop circuit 310. FIG. 8C illustrates detection signal SFW generated by gate circuit 304. FIG. 8D illustrates carry pulse SFC generated by counter 307. FIG. 8E illustrates frame synchronizing signal detection signal SFG generated by OR gate 306.

In FIG. 8, the amount of cycle slip is small when there are a large number of random errors in the reproduced signal and a relatively small number of burst errors. The amount of cycle slip is much greater when there are many burst errors. The width of window pulse PW varies according to the number of errors in the signal so that the detection signal for the frame synchronizing signal is substantially certainly contained within the width of window pulse PW even considering the cycle slip. Gate circuit 304 generates detection signal SFW to clear counter 307 before carry pulse SFC is generated so that the width of window pulse PW is narrowed. Accordingly, carry pulse SFC is dropped during the period where the cycle slip occurs, as shown in FIG. 8D. During the period where the drop outs occur, a frame synchronizing signal is not detected within the width of window pulse PW, so that gate circuit 304 does not generate detection signal SFW. However, if counter 307 is correctly cleared by one detection signal SFW before the drop outs occur, counter 307 generates carry pulse SFC having the correct frame period. Carry pulse SFC is then supplied through OR gate 306 to output terminal 317 as frame synchronizing signal detection signal SFG.

In FIGS. 9A to 9E, the digital signal supplied to the circuit of FIG. 7 contains a cycle slip and drop outs in the seventh and eighth periods. The period length exceeds the normal frame period because of the cycle slip. Detection signal SFW from gate circuit 304 clears counter 307 after counter 307 has generated carry pulse SFC so that the timing of carry pulse SFC differs from the normal timing. As illustrated in FIG. 9E, frame synchronizing signal detection signal SFG supplied at input terminal 317 has double frame synchronization signals as a result of the cycle slip.

In FIG. 10A, the digital signal supplied to the circuit of FIG. 7 includes a doubtful frame synchronizing signal mixed with the frame synchronizing signal, and a drop out in the fourth period. In addition, the reproducing apparatus is operated in a search mode to access the beginning of an audio signal, during which time frame synchronizing signal detection signal SFO drops out. The doubtful frame synchronizing signal does not fall within the width of window pulse PW so that the doubtful frame synchronizing signal is eliminated, and gate circuit 304 delivers a correctly timed detection signal SFW. During the search mode of operation of the reproducing apparatus, gate circuit 304 does not generate a detection signal SFW in response to output signal SL from supervisory counter 312. As noted before, supervisory counter 312 generates output signal SL when three frame synchronizing signals have been omitted. Gate circuit 304 is thus opened by output signal SL, as indicated in FIG. 10F. When the reproducing apparatus is operated in the normal playback mode, after operation in the search mode, gate circuit 304 generates detection signal SFW which places supervisory counter 312 into the load mode and clears counter 307. Carry pulse SFC becomes discontinuous just after the search mode is terminated, as illustrated in FIG. 10D, but is correctly synchronized shortly thereafter.

As hereinbefore described, frame synchronizing signal detecting and compensating circuit 300 produces frame synchronizing signal detection signal SFG even when a drop out in the digital signal occurs. Frame synchronizing signal detecting and compensating circuit 300 also produces output signal SL to indicate whether the frame synchronizing signal has been reliably detected. As explained above, output signal SL determines whether phase control system 200 is added to velocity control system 100.

It is to be appreciated that a frame synchronizing signal detecting and compensating circuit in accord with the present invention does not require a memory with a large capacity or the like.

As will be evident from the discussion hereinbefore, when an erroneous frame synchronizing signal occurs at the same position during consecutive frame periods, such erroneous signal can be removed since the frame synchronizing signal detection signal is gated by a gate pulse which is wide enough to accommodate the correct frame synchronizing signal but narrow enough to eliminate the erroneous signal.

The compensating circuit in accord with the present invention also compensates for a dropped frame synchronizing signal when the reproducing apparatus is operated in the playback mode.

The compensating circuit in accord with the present invention further prevents an incorrect or arbitrary addition of the phase control system to the velocity control system used in determining the rotational speed of the disc since the phase control system is added to the velocity control system in response to a signal from a supervisory circuit which keeps watch on whether the frame synchronizing signal is reliably detected.

It is to be further appreciated that the supervisory circuit operates immediately when the reproducing apparatus is operated in the playback mode and also in response to the state of the reproduced signal. Accordingly, the speed control system for the reproducing apparatus can be correctly operated since the output signal from the supervisory circuit is used to control the addition of the phase control system to the velocity control system.

The present invention is not limited to a reproducing apparatus for a pulse coded modulation audio disc, but can be applied to any apparatus which reproduces a digital signal recorded in the base band and which, upon reproduction, has a frame or block synchronizing signal.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. In a detecting and compensating circuit of an apparatus for reproducing a digital signal separated by frame synchronizing signals, each having a predetermined frame period, the combination comprising:
   detecting means for detecting said frame synchronizing signals and generating respective detection signals in response thereto;
   gating means receiving said detection signals for gating the latter in response to gating signals; and
   windowing means including first means for supplying first window signals of a first predetermined length synchronized with said detection signals as said gating signals to said gating means, and second means for supplying second window signals of a second predetermined length as said gating signals to said gating means when a plurality of said detection signals are not generated, said second predetermined length being greater than said first predetermined length.

2. The circuit of claim 1; wherein said second means includes supervisory means for detecting deviations in phase between said first window signals and said detection signals as gated by said gating means and for supplying said second window signals to said first means to vary the timing of said first window signals in the sense to correct said deviations therebetween.

3. The circuit of claim 2; and wherein said apparatus for reproducing has a servo circuit responsive to said second window signals supplied by said supervisory means for operating said apparatus for reproducing at a predetermined speed suitable for said reproducing of said digital signal.

4. The circuit of claim 3, wherein said servo circuit includes speed control means for effecting small changes in said operating speed of said apparatus; and wherein said second window signals from said supervisory means selectively actuate said speed control means.

5. The circuit of claim 1; wherein said first means includes:
   clock means for generating clock signals corresponding to said frame periods of said digital signals; and
   counter means for counting said clock signals and for generating said first window signals when a count derived therefrom exceeds a predetermined value.

6. The circuit of claim 5; wherein said detection signals gated by said gating means reset said counter means to a predetermined value.

7. The circuit of claim 5; wherein said windowing means includes means for determining said predetermined length of said first window signals.

8. The circuit of claim 7; wherein said means for determining includes:
   means for determining a beginning time of each of said first window signals and for generating a beginning signal in response thereto; and means for determining an end time of each of said first window signals and for generating an end signal in response thereto.

9. The circuit of claim 8; wherein said means for determining a beginning time is connected to said clock means and generates a count corresponding to said predetermined frame period less one-half of said predetermined length of said first window signals to determine said beginning signal, and wherein said means for determining an end time is connected to said clock means and generates a count corresponding to one-half of said predetermined length of said first window signals to determine said end signal.

10. The circuit of claim 8, in which said counter means receives clock signals for operation therewith; and wherein said end signals are supplied to said counter means as said clock signals.

11. The circuit of claim 7; wherein said first means includes generating means connected to said means for determining for generating said first window signals with said first predetermined length; and said windowing means includes OR gate means for receiving said window signals from both said generating means and said supervisory means and for supplying said window signals to said gating means.

12. The circuit of claim 11; wherein said generating means is a flip-flop circuit.

13. The circuit of claim 7; wherein said supervisory means includes controller means for supplying control signals to said means for determining to vary said first predetermined length of said first window signals.

14. The circuit of claim 13, in which said apparatus for reproducing is operable in a plurality of modes; and further comprising system controller means for supplying signals to said controller means to vary said first predetermined length of said first window signals in accordance with said modes of said apparatus for reproducing.

15. The circuit of claim 13, in which said digital signal has a plurality of states; and further comprising RF detector means for detecting said states of said digital signal and supplying signals to said controller means to vary said predetermined length of said first window signals in response thereto.

16. The circuit of claim 13; and further comprising error correction means for supplying signals to said controller means to vary said first predetermined length of said first window signals in response to errors in said digital signal.

17. The circuit of claim 5; wherein said clock means includes:
 a clock generator for generating clock pulses synchronized with said frame period; and
 counter means for counting said clock pulses from said clock generator.

* * * * *